United States Patent
Welk et al.

(10) Patent No.: US 7,580,325 B2
(45) Date of Patent: Aug. 25, 2009

(54) UTILIZING METADATA TO IMPROVE THE ACCESS OF ENTERTAINMENT CONTENT

(75) Inventors: Douglas L. Welk, Rossville, IN (US); Francis E. Szczublewski, Macomb, MI (US); Laci J. Jalics, Ray, MI (US); Mona L. Toms, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 619 days.

(21) Appl. No.: 11/287,954

(22) Filed: Nov. 28, 2005

(65) Prior Publication Data

US 2007/0123185 A1    May 31, 2007

(51) Int. Cl.
G11B 21/08 (2006.01)
H04B 1/00 (2006.01)

(52) U.S. Cl. .................. 369/30.06; 707/104.1

(58) Field of Classification Search ............. 369/30.06, 369/30.08, 30.09, 30.23, 30.3; 707/104.1
See application file for complete search history.

(56) References Cited

U.S. PATENT DOCUMENTS

| | | | |
|---|---|---|---|
| 6,192,340 B1 | 2/2001 | Abecassis | |
| 6,563,769 B1 | 5/2003 | Van Der Meulen | |
| 6,611,678 B1 | 8/2003 | Zweig et al. | |
| 2002/0045960 A1 | 4/2002 | Phillips et al. | |
| 2002/0049974 A1 | 4/2002 | Shnier | |
| 2002/0083184 A1 | 6/2002 | Elliot | |
| 2004/0267388 A1 | 12/2004 | Perdon | |
| 2005/0021470 A1 | 1/2005 | Martin et al. | |
| 2005/0105528 A1 | 5/2005 | Kobayashi | |
| 2006/0059535 A1 | 3/2006 | D Avello | |

FOREIGN PATENT DOCUMENTS

EP    1455294    9/2005
EP    1 689 105    8/2006

OTHER PUBLICATIONS

European Search Report dated May 3, 2007.
EP Search Report dated Aug. 13, 2007.

*Primary Examiner*—Lee Nguyen
(74) *Attorney, Agent, or Firm*—Jimmy L. Funke (57) ABSTRACT

Although current radio receivers support playback of audio from multiple sources, none support easy searching for content across these sources. There is no mechanism for locating specific content independent of the source that it is found on. The invention is to have an entertainment system which utilizes metadata to offer a feature that will allow the user to listen to any audio source based on their listening preference. This invention also allows the user of a radio receiver to be able to easily locate music of a particular genre without regard to the actual source. This invention further provides a mechanism for the music stored on a hard drive to be used to create a personalized radio station, complete with inserts of localized information.

33 Claims, 9 Drawing Sheets

Sample Interface Depictions

Music Library Interface 700

Select Genre 702

Genre list 704 includes music from all available sources

Fig. 7A

Music Library Interface 706

Select Genre 708

Select Album/ Station 710

Individual sources 712 are grouped and indicated appropriately

UTILIZING METADATA TO IMPROVE THE ACCESS OF ENTERTAINMENT CONTENT

TECHNICAL BACKGROUND

The present invention generally relates to utilizing metadata to improve the way audio and other entertainment content is accessed.

BACKGROUND OF THE INVENTION

The development of radio began over a century ago. In 1877, Thomas Edison was experimenting with a new telegraph device when he accidentally ran indented tin foil under a stylus. The resulting speech-like noise encouraged him to develop an instrument that can both record and reproduce sound. By the end of the year Edison had produced the first working phonograph able to "store" and playback sound. Florence Nightingale's voice was recorded on the Edison Phonograph in 1890.

In 1895, at age 21, Guglielmo Marconi first transmitted radio signals across the hills behind his home in Bologna, Italy. On Dec. 12, 1901, Marconi, standing on Signal Hill, St. John's, Newfoundland, received the first transatlantic wireless signal. The signal, the letter "S" in Morse code, was transmitted from over 1800 miles away at Poldhu, Cornwall, England. Marconi changed the world of communications forever by successfully completing the world's first transatlantic wireless transmission. Marconi's historic achievement served as a catalyst for the age of wireless communication.

The invention of the vacuum tube diode by J. Ambrose Fleming in 1904 and the triode vacuum tube amplifier by Lee DeForest in 1906 launched radio broadcasting as we know it. In the United States, radio-broadcasting stations began transmitting signals in the 1910's and 20's. Widespread radio broadcast soon caused a decline in the manufacture of records because radio delivered music free of charge.

Vinyl LP (long play) records were introduced in 1948 and allowed up to thirty minutes of music per side. 8-track tape cartridges were developed in the 1960's. 8-track tape players were first made available as a car accessory, with a home player introduced shortly thereafter. In 1966, Sony Corporation of Tokyo, Japan ("Sony"), and other Japanese manufacturers began mass production of cassette tapes and tape recorders in response to growing demand of the new standardized compact cassette tape format. Compact Disc ("CD") Technology was introduced in the United States in the spring of 1983. CD-ROM drives hit the computer market in 1985. Today, the CD, with vinyl records and cassettes virtually eliminated in many world markets, dominates the marketplace.

In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM" which is a registered trademark of XM Satellite Radio, Inc. of Washington, D.C.), and 12.5 MHz of which are owned by Sirius Satellite Radio, Inc. of New York City, N.Y. ("Sirius" which is a registered trademark of Sirius Satellite Radio, Inc. of New York, N.Y.). Both companies provide subscription-based digital audio that is transmitted from communication satellites, and the services provided by these—and eventually other—companies (i.e., SDAR companies) are capable of being transmitted to both mobile and fixed receivers on the ground.

HD (high definition) Radio is a new technology that enables AM and FM radio stations to broadcast their programs digitally. These digital broadcasts provide listeners with radically improved audio quality and reception and new data services, all free to consumers, similar to today's analog AM and FM radio. Data services such as displayed song and artist information, weather and traffic alerts enhance the AM and FM radio experience.

Today's consumer has many sources to choose from when seeking audio entertainment. Several technologies are currently available that provide data (known as metadata), such as artist name, song title, and genre that describes the audio content. The delivery mechanism for this data is different for each audio source (ID3 tag, RDS, etc.). Fortunately the data provided by each source has sufficient overlap in the information provided. In addition, audio entertainment systems are adding mechanisms that enable features including an ability to pause, store and rewind live broadcasts. Analysis software is available that will auto-generate the identifying data, thereby making it possible to ad when it is missing from the original source. In fact, some of this software has the ability to locate audio that is "similar to" a specific track.

Beginning with FM-RDS in the 1990's, it has been possible for broadcasters to indicate the genre, or musical style, of the music that they play. For example, a station broadcasting predominantly country music can send this information as data along with the audio broadcast. RDS receivers are capable of receiving and decoding this data in order to provide the user the capability of locating stations that play the desired musical genre. The broadcast of genre information was later adopted by many of the digital broadcast systems such as Digital Audio Broadcast (DAB), HD-Radio and the Satellite Digital Audio Radio System (SDARS). In addition, digital music encoding formats such as MP3 or Windows Media Audio (WMA) utilize tags or metadata to indicate the musical style (genre) of the song.

Audio entertainment systems are capable of providing audio content from a variety of sources such as broadcast audio (AM, FM, SDARS, etc.) and pre-recorded audio (CD, cassette tape, flash memory, hard drive, etc.). Typically, audio content is played back from a single source at a time, and is changed under user control. As currently implemented, the audio source dictates the type for the content provided. For example, when the source is a CD then the audio content is limited to what is on the CD, typically music from a single artist or group. Alternatively, when the source is broadcast audio then the content is the defined by the broadcast station, and usually belongs to a single genre or style of music.

SUMMARY OF THE INVENTION

The present invention discloses a technique that will allow the user to listen to any available audio source based on their listening preference, for example all songs by a specific artist. Enabling technologies include those that identify the audio source (ID3, RDS, analysis software, etc.) and have the ability to store audio. Current radio receivers support playback of audio from multiple sources; however, none are known to support easy searching for content across these sources. There is no mechanism for locating specific content independent of the source that it is found on. The result is that the user expends additional cognitive effort to select both the source and the content versus deciding upon the content alone.

The present invention also involves a technique that allows the user of a radio receiver to be able to easily locate music of a particular style (genre) without regard to the actual source. The audio may be received via AM/FM, HD-Radio, SDARS, local CD(s), local hard disc drive (HDD), the Internet, or any other conceivable source that indicates genre. The broadcast of genre information has been adopted by many of the digital broadcast systems. In addition, digital music encoding formats utilize tags or metadata to indicate the musical genre of the song. This data may be utilized to enable the user to locate a particular genre of music without regard to the actual sources available.

The present invention also provides a mechanism for the audio stored on a hard drive to be used to create a personalized radio station, complete with inserts of personalized information. Most drivers spend the majority of their time in the vehicle listening to AM and FM broadcast radio even though many other entertainment sources are available. One primary reason is that AM/FM broadcast stations provide desired information such as news headlines, local weather forecasts and traffic reports that is generally not available from the other sources. The present invention provides a mechanism that allows the user to listen to music or other audio information stored on a hard drive while still receiving localized information, creating a type of personalized radio station.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Analysis Software" generally refers to software that uses algorithms that analyze the audio information in a digital-music file and generate values for a predefined number of parameters that correspond to the musical content. The software finds files with similar content by comparing parameter values. For example, the tempo parameter reflects the overall sense of speed, not just beats per minute. The tempo algorithm looks for peak events and repeated patterns within certain frequency spectra, while filtering out patterns that don't correspond to overall speed.

"Bit Rate" hereinafter refers to the amount of information (or bits) that is transferred per second (bits per second or bps). MP3's are measured in thousands of bits per second (kbps) and the higher the kbps, the better the sound quality.

"CDDB" hereinafter refers to Gracenote's online-based Compact Disc Database that allows a user to download artist names, album titles, track names, etc. It contains the largest online database of music information in the world, and is used by over 1 million people in over 130 countries every day. The database handles soundtracks and other compilations, expanded album and track fields, credits, genres, ISRC code, web-links and segments provide music fans with access to a huge store of information on their favorite music.

"Compression" generally refers to the process of reducing the range of audio signals in a recording, thus decreasing the size of the file. MP3 compression eliminates frequencies inaudible to the human ear, though a bit rate below 128 kbps produces a discernable loss in sound quality.

"Direct Broadcast Satellite" or "DBS" hereinafter refers to a technology to deliver a television or audio signal digitally, directly from a satellite to a consumer's dish or receiver.

"GUI" or "Graphical User Interface" hereinafter refers to a software front-end meant to provide an attractive and easy to use interface between a user and application.

"ID3 Tag" hereinafter refers to information embedded in an mp3 file, such as artist, title, and track information. An ID3 Tag is an example of metadata. An ID3 Tag editor allows editing of this information. Without an ID3 Tag, an mp3 file would be recognizable only by the name of the file itself. ID3 Tags are important to playlists because the tags identify the pieces of music.

"MP3" or "MPEG-1, audio layer 3" hereinafter refers to a form of digital audio compression that reduces the size of audio files without drastically compromising sound quality.

"Media" or "media data" generally refers to data that encodes audio, video, graphic, or other presentation information/content.

"Media player" hereinafter refers to a hardware device containing software that allows a user to play and manage audio and video files.

"Memory stick" hereinafter refers to a flash memory storage device.

"Metadata" hereinafter refers to "data about data." For example, the title, subject, author, and size of the file constitute metadata about the file itself. In the context of the present invention, metadata generally refers to information embedded in an audio file, such as artist, title, and track information.

"Playlist" generally refers to a custom index of audio pieces that play in a certain order.

"Radio Display System" or "RDS" hereinafter refers to a radio broadcast technology for displaying the artist, album, and track title information such as presented on conventional FM radio receivers.

"Stitch" or "Stitching" generally refers to using digital techniques to connect and blend multiple photographs into one. In regards to audio and video streaming material, stitching refers to inserting audio and/or video frames in an order that maintains the continuity of the stream. Stitching may be thought of as digital splicing, where digital frames are used to replace damaged or missing frames of an audio and/or video stream.

"Track" generally refers to a predefined segment or portion of media data.

Although current radio receivers support playback of audio from multiple sources, none are known to support easy searching for content across these sources. The present invention provides an entertainment system that will allow the user to listen to any audio source based on their listening preference, for example all songs by a specific artist. In the context of the present invention, the entertainment system is a hardware/software combination that utilizes available metadata in presenting media data. The system may include control buttons (user inputs, play, pause, volume, etc.). The system may also display captions or other text (if available).

Enabling technologies include those that identify the audio and have the ability to store audio. The disclosed system matches audio information in which data exists (metadata) that describes the audio. For example, the metadata may be ID3 tags in the case of mp3 files or, if an Internet connection exists, the metadata may be obtained by completing a CDDB lookup. Other technologies are available to determine certain information about a digital audio file and associate further information with the digital audio file, and such associated information is capable of being metadata for the purposes of the present invention.

Figure 1:
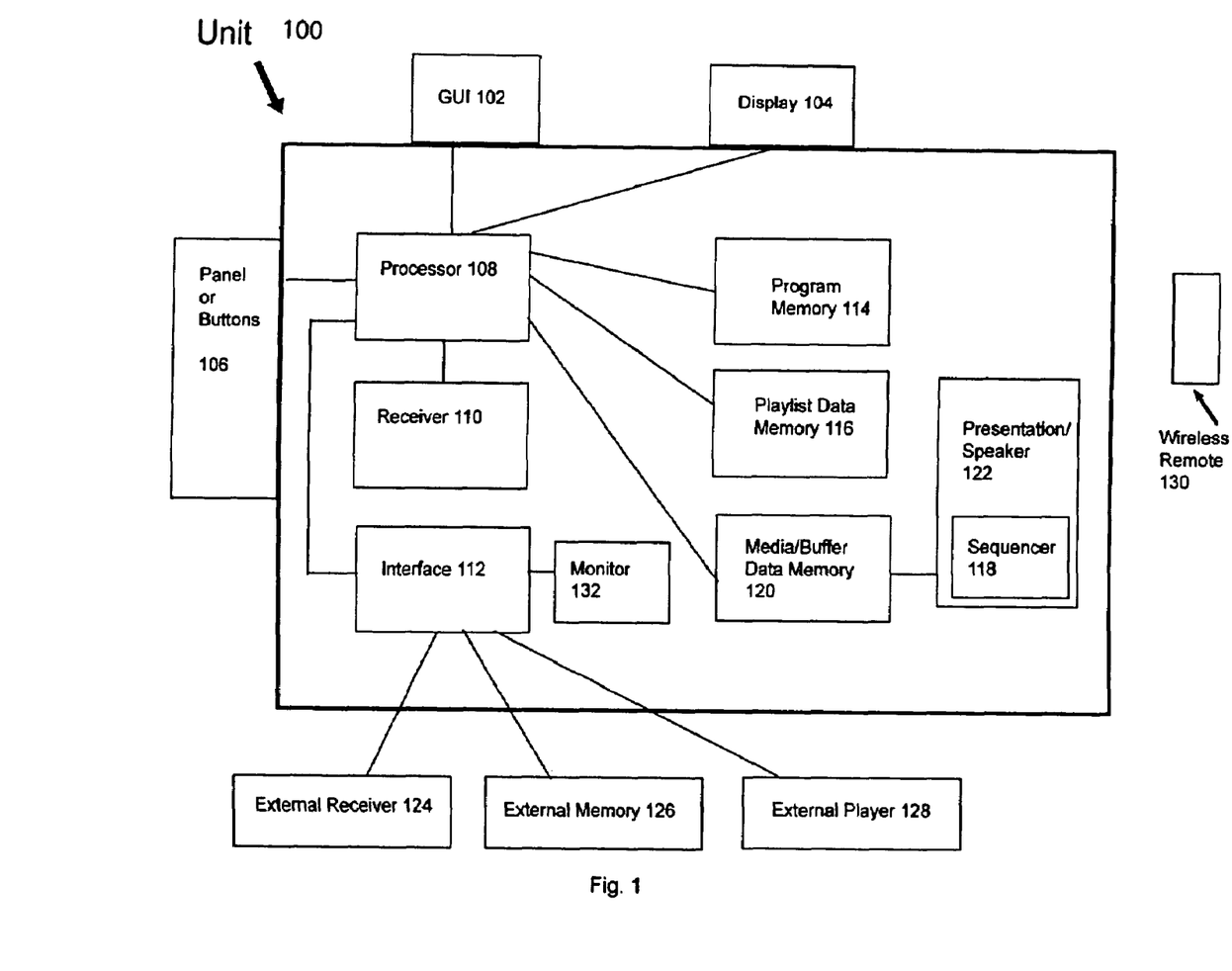
FIG. 1 is a schematic representation of an apparatus for utilizing metadata to improve the way audio content is accessed.

One embodiment of the present invention is depicted in FIG. 1 as Unit 100. GUI 102 and Display 104 are used to prompt the user to select the specific listening preference desired, artist for example. The user inputs or selects a specific value, such as an artist name, by using Panel or Buttons 106. Interface 112 connects available media sources such as External Receiver 124, External Memory 126 and External Player 128. External Receiver 124 may include AM/FM radio or an SDARS channel. External Memory 126 may include a hard drive or memory stick. External Player 128 may include a CD-Rom, cassette player or mp3 player.

Processor 108 selects media data by comparing available metadata and comparing the metadata based on the user value entered. Receiver 110 receives the media data, while Interface 112 provides a connection to sources outside Unit 100. Software used by Processor 108 is stored in Program Memory 114. Processor 108 creates a playlist from the media data received. The location of the media data among the plurality of available sources is stored in Playlist Data Memory 116. Media data received and sequenced is stored in Media/Buffer Data Memory 120. Sequencer 118 may be used to sort the media data received into sequential or random order. The media data is then presented to the user via Speaker 122. Wireless Remote 130 may be used to perform media player functions such as play, pause and volume adjustment. Monitor 132 monitors Interface 112 to determine whether any new media sources have become available or whether an existing media source has become unavailable. A new media source may be a new CD, a new device from which audio information may be obtained (for example a personal digital assistant, PDA, a portable digital audio player, or a mobile digital device such as an iPod, iPod being a trademark of Apple Computer, Inc. of Cupertino, Calif.), or a communications channel from which audio information may be obtained.

Figure 2:
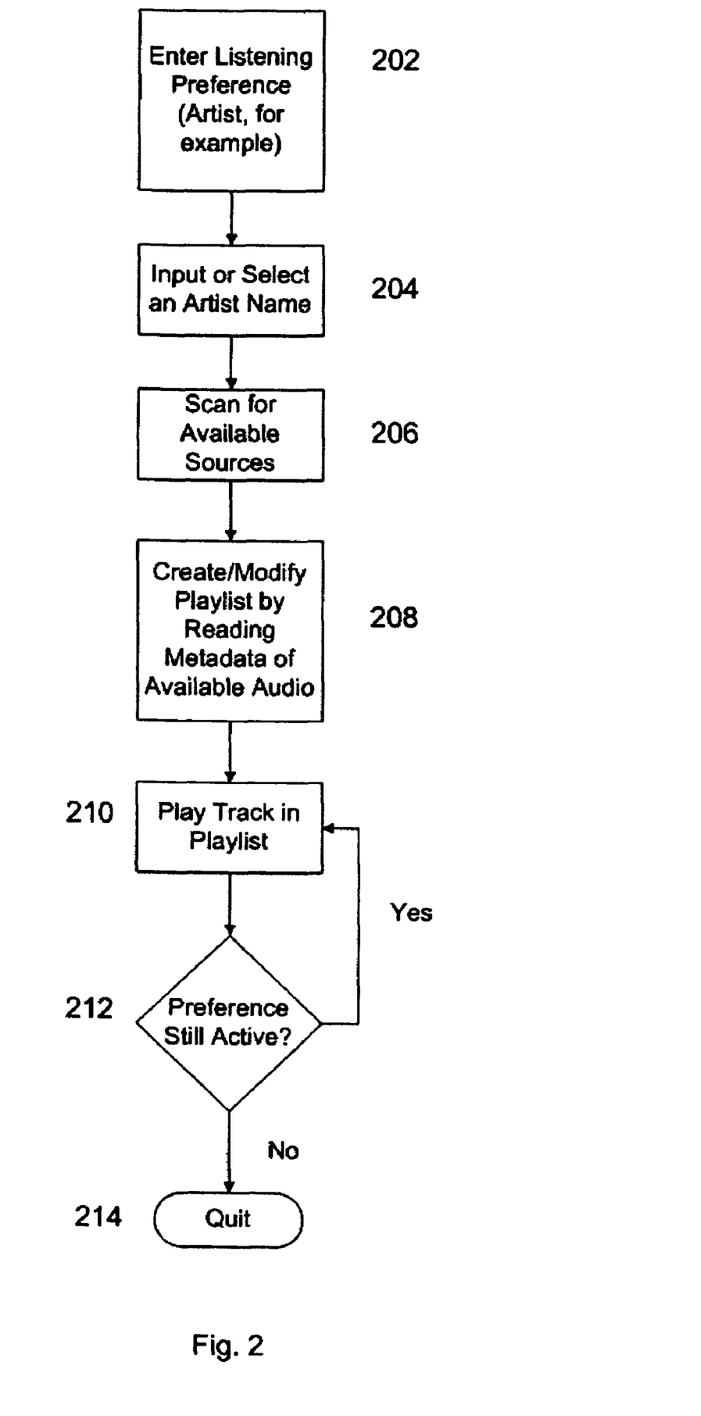
FIG. 2 is a flowchart diagram of a technique for the automated play of a specific artist.

Another embodiment of the present invention is depicted in FIG. 2. Functionally, the user activates a control that invokes the specific listening preference desired, artist for example (step 202). Next, the user inputs or selects a specific value such as artist name (step 204). After scanning for available sources (step 206), the system may create a dynamic playlist by searching each available track's metadata for matching audio (step 208). The scanning step 206 may operate continuously, so that in step 204 a list of available values (artists, genres, time value, etc.) is already available. The discovery process may play the first title discovered and continue to play all matching audio (step 210) until the user cancels the preference (steps 212, 214). One mechanism that may be used to specify the listing preference is to select an artist, a genre, a time period, etc. from the library of tracks already known to be available on a connected hard drive, flash based media, connected mp3 player, etc. The system uses the selection path (e.g., artist name, genre name, time period) to determine the criteria to be used to pick songs for playback.

The system scans each broadcast station as well as pre-recorded sources in order to find matching audio. The system may also be programmed to intermittently determine if any new sources have become available or if a previous source has become unavailable. Any duplicates may also be managed. Techniques are used to expedite the broadcast audio search. For example, one technique includes looking for the artist only on stations of the appropriate genre. Also, pre-recorded audio may have a database organized for fast searching. The playlist is continuously updated as long as the preference is active. The display may also provide data about the currently played audio, with an additional control that would offer additional information about the audio track.

Figure 3:
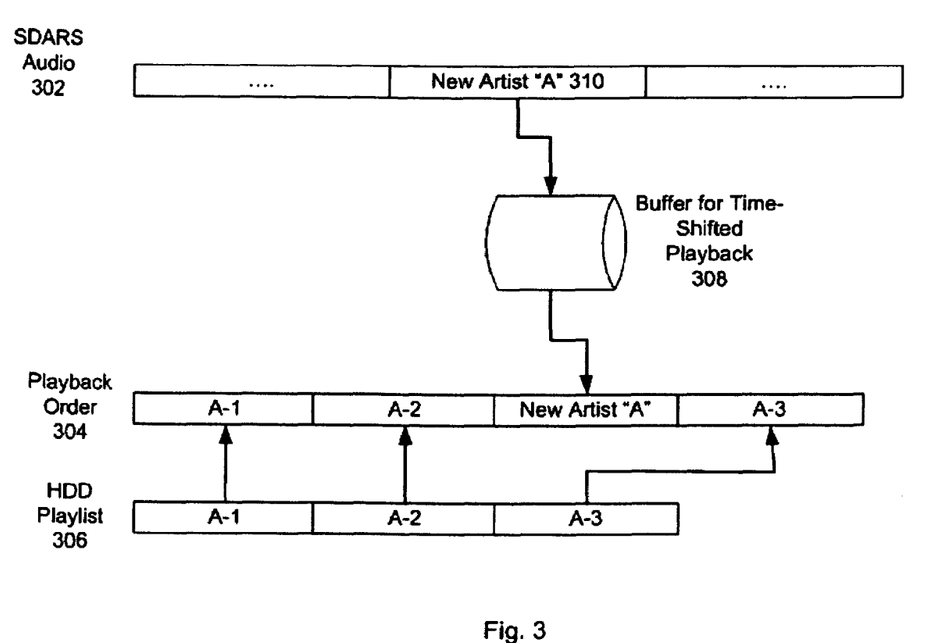
FIG. 3 is a schematic representation of a technique for selecting audio content based on a user selection.

FIG. 3 demonstrates an example of such a system where the user has selected a desire to listen to the artist A. Initially, the music is selected from the hard drive 306 because that is the only source of material. However, while the song A-2 is being played, SDARS channel 302 begins to play A song 310 that is not on hard drive 306. The software recognizes this and stores the new song for later playback in buffer 308. When the title A-2 concludes, A song 310 is inserted into playlist 304 and played back from buffer 308.

Figure 4:
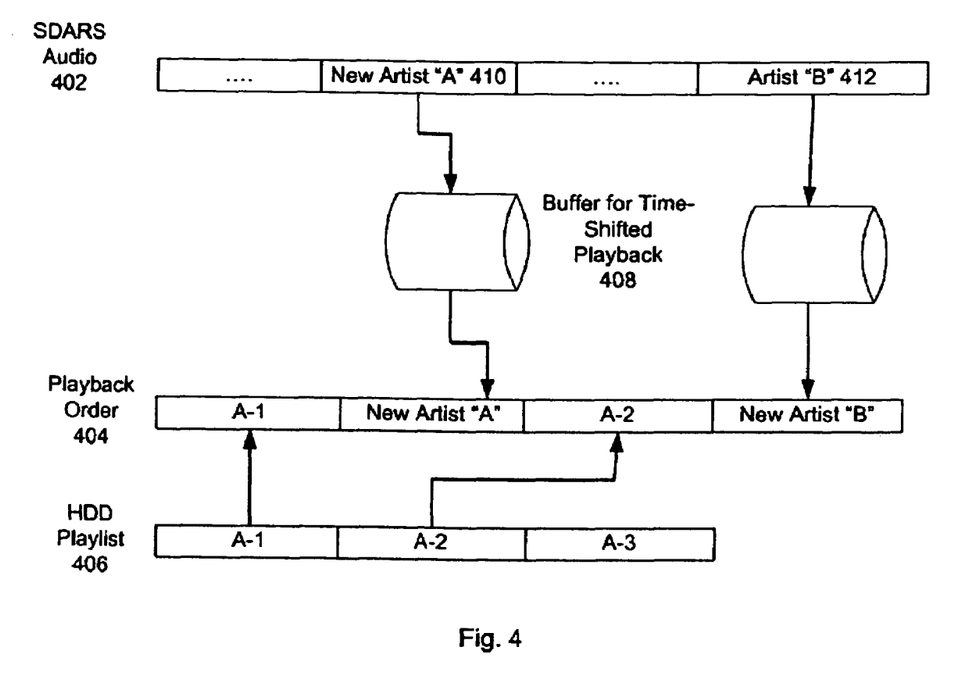
FIG. 4 is a schematic representation of a technique for selecting audio content similar to a user selection.

In another embodiment of the present invention, the user would have the ability to invoke a "like" feature, as shown in FIG. 4. Operationally, it would function in much the same manner as already described. Some analysis software have the ability to locate audio that is "similar to" a specific track. For example, HDD Playlist 406 includes songs from artist A. Using the above example, the "like" feature is enabled and the system detects SDARS audio 402 includes new A song 410 and B song 412. B is a group similar to A. B song 412 is stored in buffer 408 and inserted into playback order 404 at an appropriate future time. Metadata tag information may be used to find similar artists. For example, artists in same or similar genres may be identified by analyzing the available metadata. A separate knowledge base may also be used that provides information on similar artists.

Figure 5:
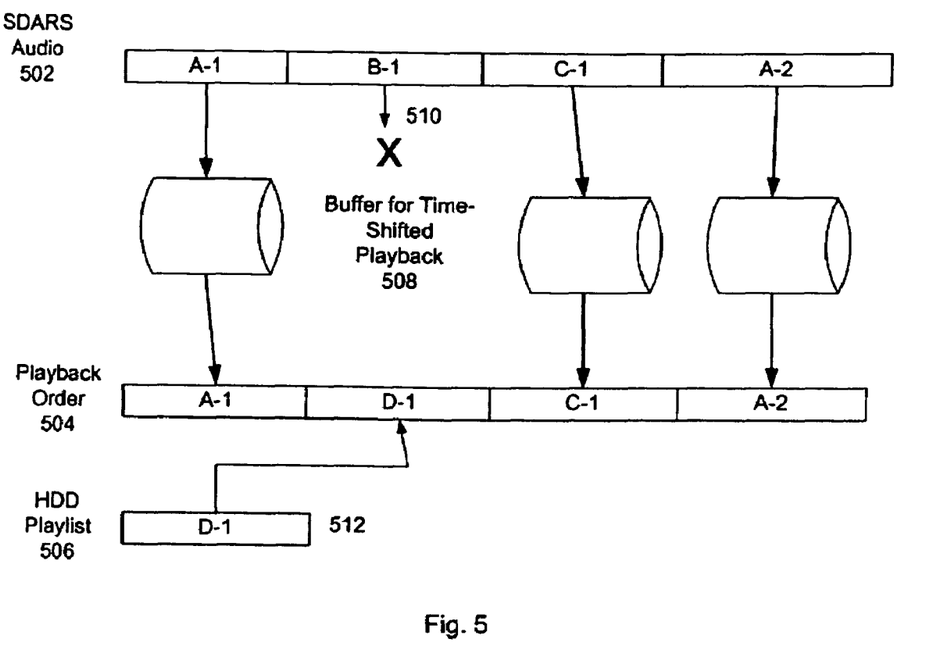
FIG. 5 is a schematic representation of a technique for excluding selections from a playlist.

In another embodiment of the present invention, the user would have the ability to use the same selection mechanism to define songs that the user does not want to hear, as depicted in FIG. 5. In this case, an appropriate selection will be made from an alternative audio source whenever a song matching the specified criteria on the primary source. For example, suppose a listener is a country music fan, but does not like country music artist B. If this listener is tuned to SDARS audio 502 and B song 510 is received, D song 512 will be substituted from HDD library 506 into playback order 504 during the time that B song 510 is being broadcast. Note that in this case, it will likely be necessary to time delay all SDARS content by a small amount of time in order to ensure that the listener does not hear a tiny portion of the beginning of the B song.

Figure 6:
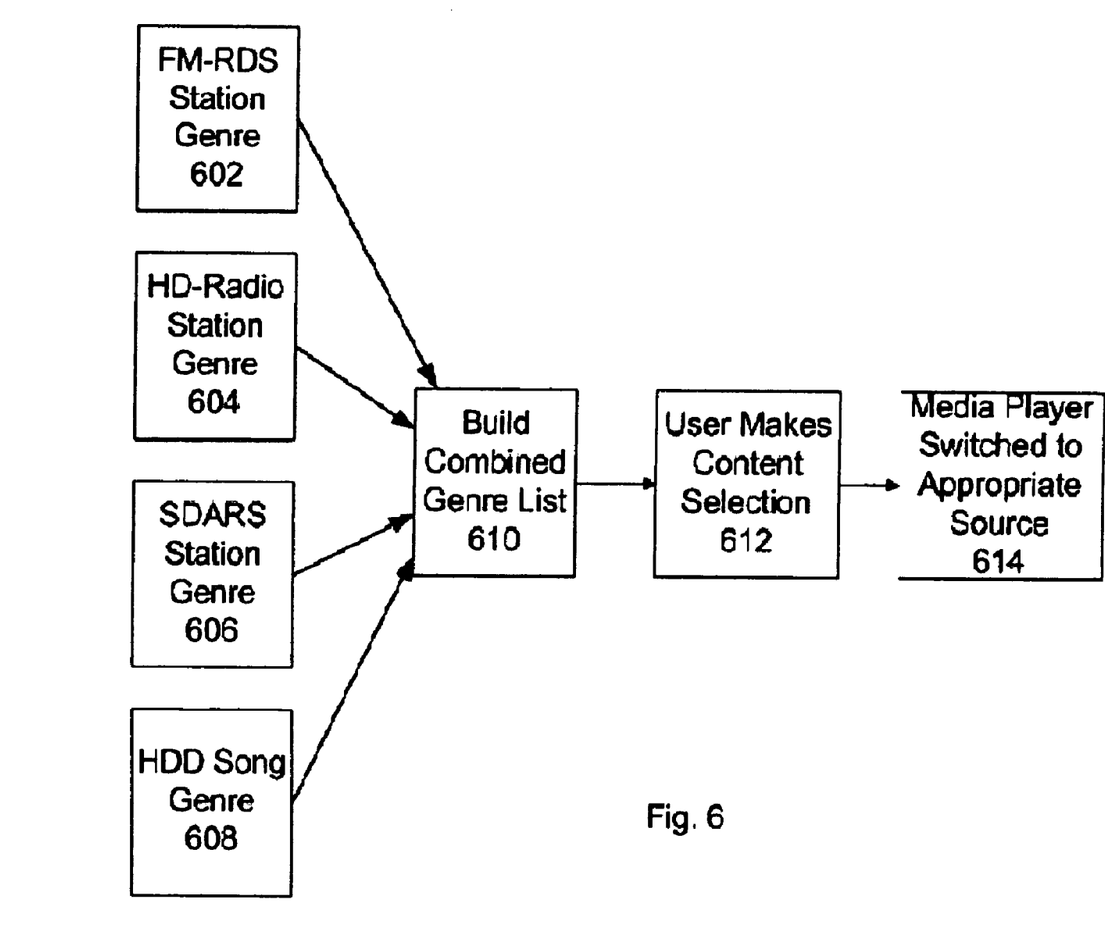
FIG. 6 is a flowchart diagram of a technique for creating a genre list.

One exemplary form of the present invention is shown in FIG. 6. The genre information of all audio files from available sources 602, 604, 606, 608 is combined (step 610) into music library catalog system (MLCS). If a new source becomes available and the genre of the new source does not match the genres of MLCS, the new one may be incorporated. Since the genre list will include music from many different sources, MLCS also may store a listing of the names and locations of all sources of the music. Appropriate source names may include broadcast station name, channel and/or frequency, CD track number, album name, etc. The user then makes preference selection (step 612) and the media player switched to the appropriate source (step 614).

Figure 7A:
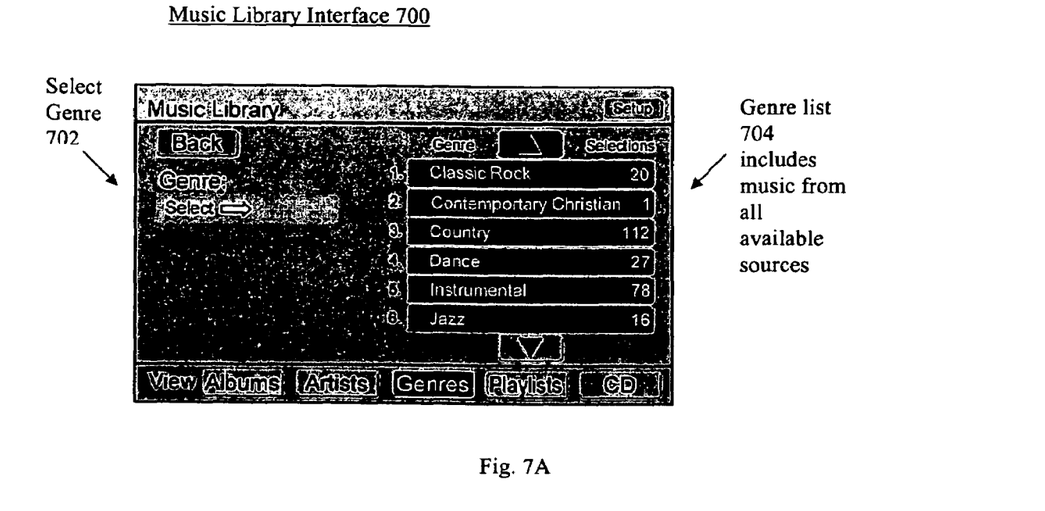
FIGS. 7a and 7b are depictions of sample interface screens utilizing a genre list.

An example depiction of a music library interface for building a genre list is shown in FIG. 7A. Music library interface 700 includes user genre selection 702. Genre list 704 is generated from all available sources. In the example, all genres from all available sources are displayed in genre list 704.

Figure 7B:
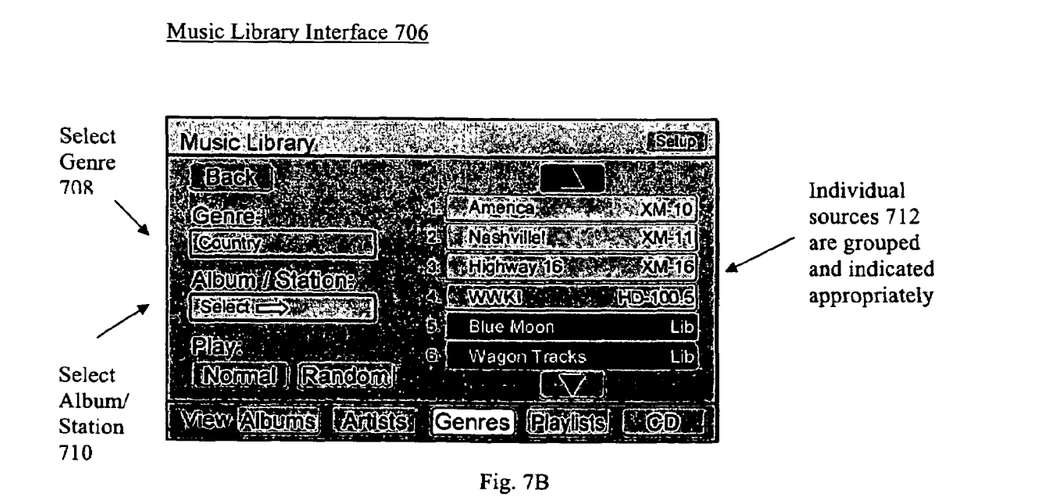

Another sample interface depiction is depicted in FIG. 7B. Music library interface 706 includes user genre selection 708. Album/station selection 710 is the made by user. Individual sources 712 are grouped and indicated appropriately. For example, for a receiver equipped with satellite radio, all the channels playing country music would be grouped together within the "Country" genre menu. This menu may include receivable country FM stations, country albums or artists from the hard drive, as well as country music from any other available source. Broadcast audio locates at the top of each genre listing, because broadcast audio contains greater content (i.e., a station playing many songs within selected genre) rather than the individual song listings. This is akin to a computer file directory where folders are listed before file names. Another feature involves random play restricted to the chosen genre but open to any audio source providing the genre of interest.

Market research indicates that drivers spend the majority of their time in the vehicle listening to AM and FM broadcast radio even though many other entertainment sources are available. One of the primary reasons for this is that AM/FM broadcast stations provide desired information such as news headlines, local weather forecasts and traffic reports that is generally not available from the other sources.

FM-RDS provides capability for a radio receiver to interrupt the content currently being listened to in order to play back a traffic report or similar announcement being broadcast on an FM station. At the conclusion of the announcement the receiver automatically returns to playing the previous source. This system works regardless of the audio source currently being played (AM/FM, CD, etc.), but is somewhat disruptive in that it switches the audio source at the moment that the announcement begins, even if this is in the middle of a song.

Figure 8:
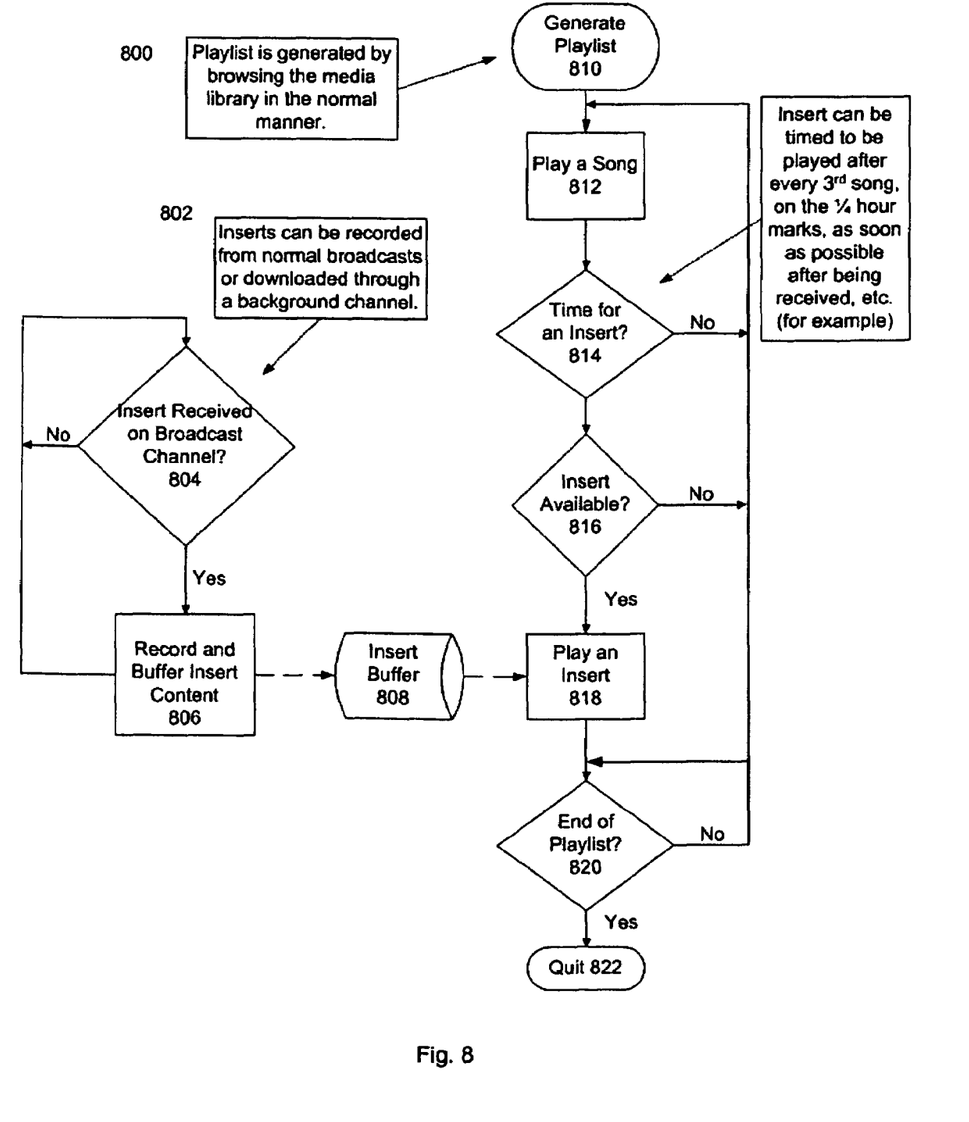
FIG. 8 is a flowchart diagram of technique for utilizing personalized radio station inserts.

One exemplary form of the present invention is shown in FIG. 8. The personalized information inserts can be obtained in multiple ways. Inserts may include localized information such as traffic reports, weather reports and community updates. Inserts may also include news updates, stock quotes and advertisements. An FM-RDS, HD-Radio or similar station or SDAR channel has the ability to indicate within the data stream that content of interest is currently being broadcast (step 802). The receiver may utilize this indication to record and store the content in a temporary buffer for later playback. Alternatively, with a digital broadcast system, the insert content may be continuously transmitted using a low bit-rate background data channel (step 802). The receiver may then simply decode and store this content in the temporary buffer (steps 804, 806, 808).

The user selects content by album, artist, genre, etc. through the normal media library (step 800) and a playlist is generated (step 810). A song from the playlist is played (step 812). At periodic points during playback of the selected content, the receiver checks to see if an insert should be played (step 814). If it is time to play an insert and the insert is available (step 816), then the insert is played (step 818). Except for emergency announcements, the inserts are played back at the end of a song, creating a user experience that closely matches that from a conventional broadcast station. If desired, sophisticated audio fades and advertisement content may be utilized to enhance the illusion. Inserts may be programmed to be played back on a variety of schedules such as immediately (emergency content), first opportunity, or following a predefined number of songs or minutes. The process ends when all songs in the playlist have been played (steps 820, 822).

Figure 9:
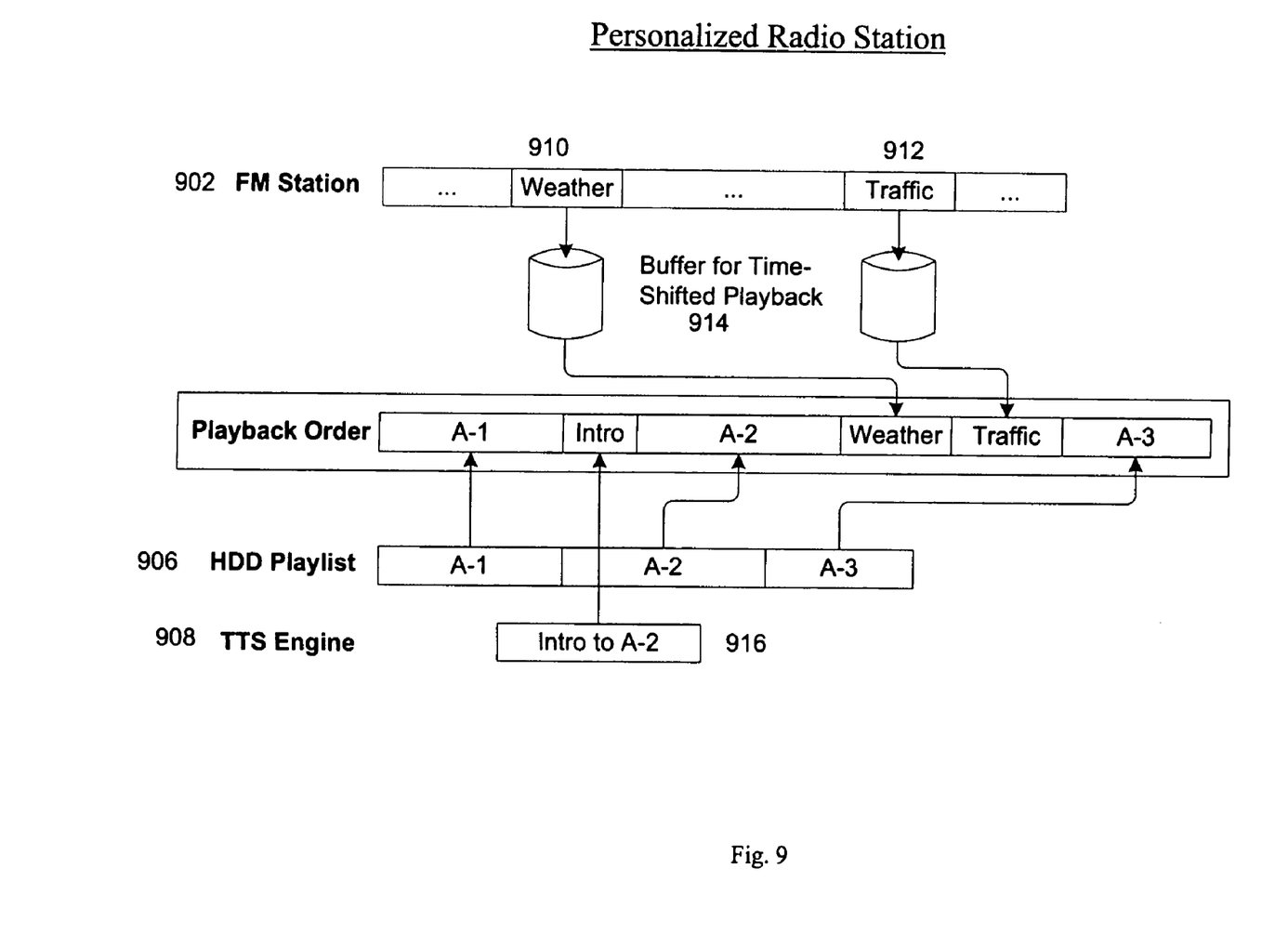
FIG. 9 is a schematic representation of a technique for creating a personalized radio station.

An example of this technique is depicted in FIG. 9. FM Station 902 includes in its broadcast weather update 910 and traffic update 912. These inserts are stored in buffer 914 for time-shifted playback. Playback order 904 includes audio from HDD playlist 906 along with inserts stored in buffer 914. Text-to-speech system 908 may also be utilized to add inserts to create so 916, similar to what a radio disc jockey ("DJ") might do.

A similar method may be utilized to effectively add local content to national broadcast systems, such as XM or Sirius satellite radio, for which the end of a song is indicated or may be deduced. For these systems, it is necessary to buffer the national broadcast content during the playback of the local inserts. Depending on the overall length and frequency of the local inserts and the size of the playback buffer, it may be necessary to occasionally delete whole songs from the playback buffer in order to avoid a buffer overflow.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method for presenting media data by a media player, comprising the steps of:
    a. accessing a plurality of media sources;
    b. selecting media data based on media content;
    c. generating a playlist from the selected media data;
    d. monitoring for a presence of a new media source;
    e. accessing the new media source;
    f. obtaining a predefined type of insert from the new media source;
    g. presenting the insert within the playlist; and
    h. presenting media data from the playlist including the insert, by the media player.

2. The method of claim 1 wherein the media content includes metadata.

3. The method of claim 1 further comprising the steps of:
    a. obtaining a user preference; and
    b. selecting media data based on user preference.

4. The method of claim 1 further comprising the steps of:
    a. obtaining a value based on the user preference; and
    b. selecting media data based on the user value.

5. The method of claim 1 wherein media data is stored in buffer area for later playback.

6. The method of claim 1 wherein media data is presented in the order discovered.

7. The method of claim 1 wherein media data is presented in random order.

8. The method of claim 1 further comprising the step of:
   a. storing a listing of names and locations of available media sources.

9. The method of claim 1 further comprising the step of:
   a. determining whether user selection is still active.

10. The method of claim 1 further comprising the step of:
    a. searching only broadcast stations of appropriate genre based on user selection.

11. The method of claim 1 further comprising the step of:
    a. presenting data about currently presented media data.

12. The method of claim 1 further comprising the step of:
    a. adding media data to playlist that are similar to user preference.

13. The method of claim 1 further comprising the step of:
    a. excluding media data based on user input.

14. The method of claim 1, wherein the step of presenting the insert comprises stitching the insert with the media content, such that there is continuity in the playlist.

15. The method of claim 1, wherein the media data based on the media content is stored in a memory.

16. The method of claim 1, wherein one of the plurality of media sources is a receiver configured to receive at least one of a satellite digital audio radio system (SDARS) signal and an AM/FM radio signal.

17. An apparatus for presenting media data, said apparatus comprising:
    a. connector circuitry coupled to a media player, the connector circuitry adapted to connect a plurality of media sources;
    b. selector circuitry coupled to the media player, the selector circuitry adapted to select available media data based on available metadata and monitor for a presence of a new media source;
    c. a processor that executes software adapted to generate a playlist from the media data, store a predefined type of insert from the new media source in a buffer area, and add the insert into the playlist; and
    d. presentation circuitry coupled to the media player, the presentation circuitry adapted to present the playlist.

18. The apparatus of claim 17 further comprising:
    a. a receiver adapted to receive media data from a plurality of media sources.

19. The apparatus of claim 17 further comprising:
    a. a first interface coupled to the media player adapted to obtain a user preference; and
    b. selector circuitry coupled to the media player, the circuitry adapted to select available media data based on the user preference.

20. The apparatus of claim 17 further comprising:
    a. a second interface coupled to the media player adapted to obtain a user value based on the user preference; and
    b. selector circuitry coupled to the media player, the circuitry adapted to select available media data based on the user value.

21. The apparatus of claim 17 further comprising:
    a. storage circuitry coupled to the media player, the storage circuitry adapted to store media data in the buffer area for later playback.

22. The apparatus of claim 17 further comprising:
    a. a playlist generator adapted to generate the playlist from the selected media tracks.

23. The apparatus of claim 17 further comprising:
    a. search circuitry coupled to the media player, the search circuitry adapted to search only broadcast stations of appropriate genre based on user selection.

24. The apparatus of claim 17, wherein the processor executes analysis software, which uses algorithms that analyze audio information in the media data, and generates a value for a predefined number of parameters that corresponds to the audio information.

25. The apparatus of claim 17, wherein one of the plurality of media sources is a receiver configured to receive at least one of a satellite digital audio radio system (SDARS) signal and an AM/FM radio signal.

26. A method for presenting media data by a media player, comprising the steps of:
    a. building a content list from a plurality of sources, wherein at least one of the plurality of sources is at least one of a schedule digital audio radio system (SDAR) broadcast and an AM/FM radio broadcast;
    b. monitoring for a presence of a new media source;
    c. obtaining a predefined type of insert from the media source based on a user content selection; and
    d. presenting media data from at least one of the plurality of sources based on the user content selection by the media player.

27. The method of claim 26 further comprising the step of:
    a. obtaining a user content selection; and
    b. selecting media data from appropriate source based on user content selection.

28. The method of claim 26 wherein media data presented is restricted to the chosen genre from any audio source providing the genre of interest.

29. An apparatus for presenting media data in a digital transmission system, said apparatus comprising
    a. an interface adapted to connect a plurality of sources of media data, wherein one of the plurality of media sources is a receiver configured to receive at least one of a satellite digital audio radio system (SDARS) signal and an AM/FM radio signal;
    b. a processor adapted to select media data according to the content of said media data, monitor for a presence of a new media source, and obtain a predefined type of insert from the media source based on a user content selection; and
    c. presentation circuitry coupled to the processor, the presentation circuitry adapted to present said media data from at least one of the plurality of sources based on the user content selection.

30. The apparatus of claim 29 wherein the media content includes metadata.

31. The apparatus of claim 29 further comprising:
    a. Playlist circuitry coupled to the processor, the playlist circuitry adapted to build a playlist from said plurality of sources.

32. The apparatus of claim 29 further comprising:
    a. a user interface coupled to the processor adapted to obtain the user content selection.

33. The apparatus of claim 29 wherein media data presented are restricted to a chosen genre from any audio source providing the genre of interest.

* * * * *